INVENTOR.
JOHN R. VANDERVOORT
ATTORNEYS

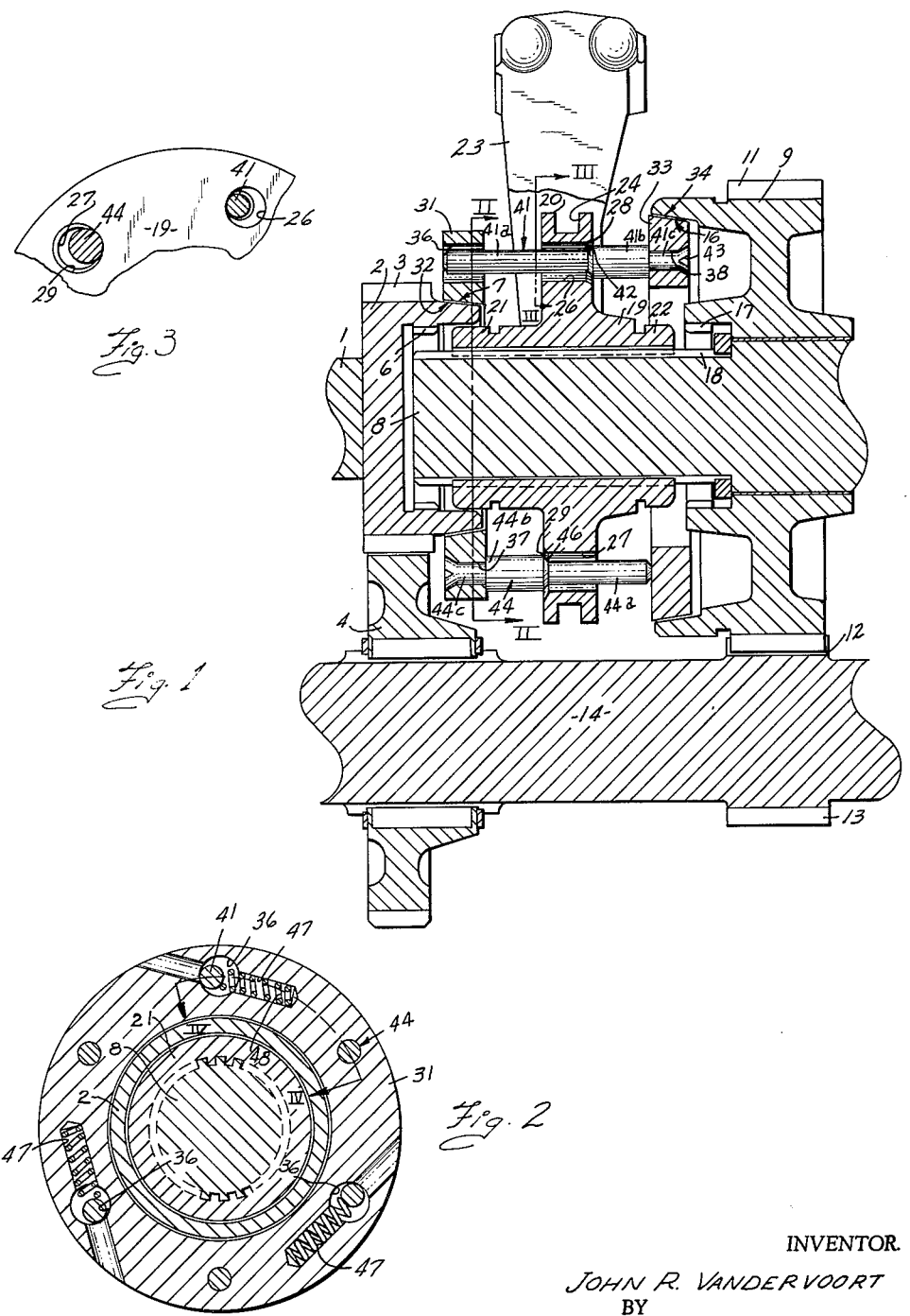

United States Patent Office 3,221,851
Patented Dec. 7, 1965

3,221,851
SYNCHRONIZED POSITIVE CLUTCHES
John R. Vandervoort, Richland Township, Kalamazoo County, Mich., assignor to Eaton Manufacturing Company, Cleveland, Ohio, a corporation of Ohio
Filed Oct. 16, 1963, Ser. No. 316,680
7 Claims. (Cl. 192—53)

This invention relates to synchronizers for shiftable gear groups and it relates particularly to pre-energizing means for the blocking portions of a synchronizer.

In the provision of synchronizing devices, especially automotive, it is well known to use axially spaced change speed gear elements with which a central sliding member alternately becomes engaged, suitable synchronizer braking means being associated with each of said change speed gear elements. In such a device, the blocking ramps of the synchronizers are often placed on elongated pins aligned parallel with the axes of the interengaging gear elements and extending between the said braking means. This general type of synchronizing means is well known, as shown, for example, in United States Patent Nos. 2,483,841 and 2,573,613, and has a number of well understood advantages both structural and operational.

However, in a continuing effort to improve these devices, the effort resulting in the present invention has been directed toward improving apparatus of the type above indicated by:

(1) Eliminating the rather considerable friction which in conventional designs has occurred from the previously used pre-energizing springs sliding on said pins, such improvement resulting in a faster and more accurate synchronizing operation;

(2) Arranging same to always be in blocking position;

(3) Reducing the cost of manufacture of such a unit by reducing the number of parts required and simplifying the assembly of the parts remaining.

Accordingly, the objectives of the invention are the following:

(1) To provide a synchronizer construction applicable to a shifting situation wherein one side thereof is always operating at a higher speed than the other side thereof, and particularly adapted for use with automotive transmissions, which synchronizer will simplify present constructions with resultant improved economy in both construction and maintenance while remaining sufficiently sturdy to provide a long period of operational reliability with a minimum of maintenance.

(2) To provide a synchronizer construction, as aforesaid, wherein reliability in operation is improved by insuring that the sliding means therein is always in alignment with a blocking ramp at the commencement of a synchronizing operation.

(3) To provide a synchronizer construction, as aforesaid, which will eliminate inaccuracies of operation presently caused by friction existing between pre-energizing springs and the pins on which said springs normally slide in present conventional constructions.

(4) To provide a synchronizer construction, as aforesaid, of the type having the blocking ramps arranged on pins which pins are in turn arranged parallel with the axes of the interengageable tooth means, wherein said pins are symmetrical about their own respective axes whereby to effect economies in both manufacture and assembly of the synchronizer unit without sacrifice in the accuracy or precision thereof.

(5) To provide a synchronizer construction, as aforesaid, in which a single set of biasing springs can be used for effecting proper alignment of the parts in preparation for a shift in either direction.

Other objects and purposes of the invention will become apparent to persons acquainted with apparatus of this general type upon reading the following disclosure and inspection of the accompanying drawings.

In the drawings:

FIGURE 1 is a central longitudinal sectional view of a gear group including a synchronizer embodying the invention.

FIGURE 2 is a section taken on the line II—II of FIGURE 1.

FIGURE 3 is a section taken on the line III—III of FIGURE 1.

*General description*

Figure 4:
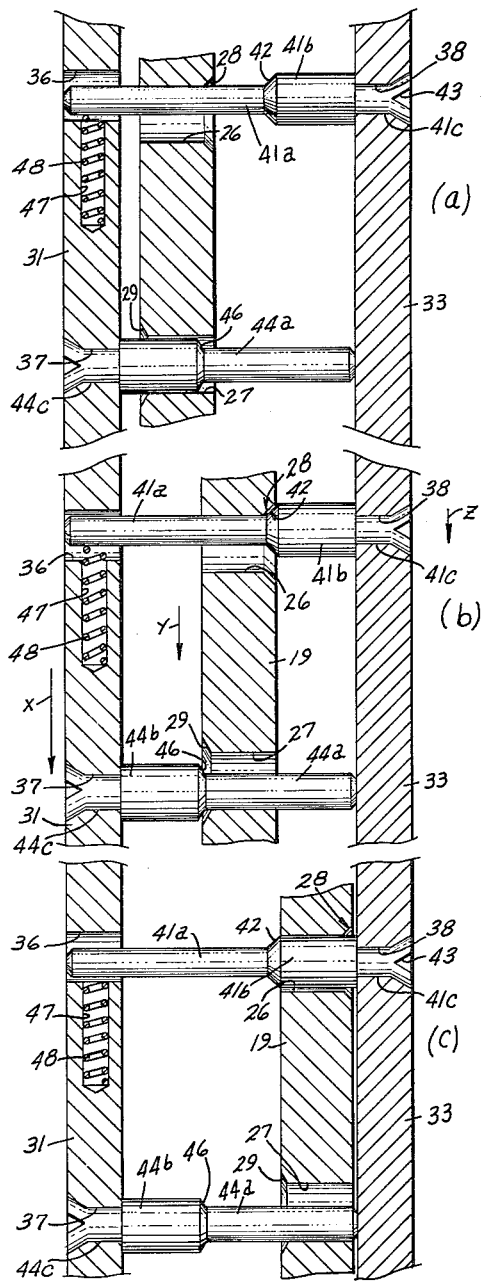
FIGURE 4 is a curved section taken substantially on the line IV—IV of FIGURE 2 and showing the apparatus in three successive positions occupied during a normal shifting sequence.

Resilient means are positioned for urging the ramp-carrying pins circumferentially with respect to the slidable means coacting with the blocking ramps. Such slidable means move with the axially sliding part of the interengageable jaw clutch with which said synchronizer operates. More specifically, said synchronizer includes two axially spaced braking rings each responsive to the slidable means for changing the speed of one of a pair of axially spaced change speed gear sets. The axially slidable unit carries a restricting ring having openings axially therethrough. Each braking ring carries one or more pins extending through said openings in said restricting ring. Springs located in and carried by one of said braking rings bear against those of said pins which are carried by the other braking ring for constantly urging the pins carried by respective braking rings in opposite circumferential directions with respect to each other whereby the pins carried by the respective braking rings will bear against opposite sides of the openings in the restricting ring.

*Detailed description*

In the following description certain terminology will be used for convenience in reference but it will be recognized that such terminology is for convenience only and is not limiting. For example, the terms "rightwardly" and "leftwardly" will refer to the drawings in connection with which said terms are used, the same normally being FIGURE 1. The terms "outwardly" and "inwardly" will refer to directions toward and away from the geometrical center of the apparatus. Such terminology will also include derivatives of the words above specifically mentioned as well as other words of similar import.

Referring now to the drawings, there is shown in FIGURES 1 and 2 a generally conventional pair of associated, axially spaced, sliding jaw clutches together with synchronizing mechanism cooperating therewith, said synchronizing mechanism embodying the present invention. While the details of the sliding jaw clutch and many of the details of the synchronizing unit are conventional, the same will be described hereinafter to assure a complete understanding of the invention.

Referring now to the drawings, there is shown a shaft 1 which may, for the purposes of the present invention, be considered as the input shaft of a transmission on which is formed an input gear 2. Said gear has external teeth 3 thereon for engagement and coaction with a countershaft gear 4 and, further, has internally arranged thereon the jaw clutch teeth 6 and an externally facing friction clutch 7 which latter comprises a braking portion of the synchronizing means. A shaft 8 is arranged coaxially with the shaft 1 and carries a gear 9 arranged thereon for free rotation with respect thereto. Said gear 9 has teeth 11 externally thereof for engagement of and cooperation with the teeth 12 of a countershaft gear 13, said gears 4 and 13 being arranged in a conventional manner on a countershaft 14. Said gear 9 has an internally facing frictional clutch surface 16 comprising a further braking part of the synchronizing means and internal jaw clutch teeth 17 for use as hereinafter further described.

The leftward end of the shaft 8 is provided with splines 18 upon which is arranged in sliding but nonrotating relationship a sliding unit 19 of the jaw clutch apparatus, said sliding unit 19 having jaw clutch teeth 21 and 22 arranged at opposite ends thereof for engagement with the jaw clutch teeth 6 and 17, respectively, upon appropriate sliding movement of said sliding unit 19. Said sliding unit 19 has a radially outwardly extending, restricting and shifting flange 20 carrying an external groove 24 for the usual shifting purposes and being pierced by a plurality of synchronizer pin openings, one group thereof being indicated at 26 and the other group thereof being indicated at 27. In this embodiment there are three openings in each of said groups. The rightward end of each opening of the group of openings 26 is provided with a blocking ramp 28 consisting of a bevel at the rightward end of said opening and a similar blocking ramp 29 is provided at the leftward end of each of the openings of the group 27. The sliding of said sliding unit 19 is effected in any convenient manner such as by a shift fork 23 received within the groove 24.

A first synchronizing ring 31 has a friction surface, here the internal surface 32, adapted for bearing frictionally against the braking surface 7 of the gear 2. A second synchronizing ring 33 has a friction surface, here the external surface 34, adapted for bearing frictionally against the braking surface 16 of the gear 9. The first synchronizer ring 31 is provided with a plurality, here three, of first synchronizer pin openings 36 and a second plurality, here also three, of second synchronizer pin openings 37. The second synchronizing ring 33 is provided with a plurality, here three, of pin-receiving openings 38 which are substantially aligned with the openings 36 but there are no openings in said second ring 33 corresponding to or aligned with the openings 37 of the ring 31.

A plurality of driving and blocking pins connect and interrelate the action of said two synchronizer rings 31 and 33 together with the flange 20.

Pins of a first group thereof are indicated at 41. Said pins 41 each has a first portion 41a of diameter appreciably smaller than the diameters of the openings 36 and 26. Next, said pins 41 have a middle portion 41b of diameter normally only sufficiently smaller than the openings 26 to pass therethrough but being connected to the portion 41a by the ramp 42. Said pins 41 have at the rightward end of each thereof an extension 41c of diameter somewhat less than that of the enlarged portion 41b which portions 41c extend through the openings 38 and are fastened in place by any convenient means, such as spreading as indicated at 43.

A further plurality, such as three, of pins 44 are shaped generally similarly to the pins 41, above described, excepting that the portions 44a thereof are shorter than the corresponding portions 41a and extend only to, but not into, the facing surface of the synchronizer ring 33. Said pins 44 have an enlarged portion 44b generally similar to the enlarged portion 41b of the pins 41 and are provided with a ramp 46 generally corresponding to the ramp 42. The portion 44c of said pins 44 is received and fixed rigidly into the openings 37 in a manner generally similar to the corresponding affixing of the portion 41c of the pins 41.

Suitable resilient means are provided for urging the synchronizing rings circumferentially with respect to each other. Particularly, means are provided on the synchronizer ring 31 bearing against the group of pins 41 (which are in turn affixed, as aforesaid, to the synchronizer ring 33) whereby said synchronizer rings are urged in circumferentially opposite directions with respect to each other. In this embodiment, a plurality of openings 47 are arranged adjacent the openings 36 in the synchronizing ring 31, said openings 47 being at such an angle with respect to the radii through the centers of the openings 36 that the hereinafter-mentioned springs will have a substantial circumferential component of force exerted against said pins 41. Springs 48 are located within each of said openings 47 and each of said springs bears against the adjacent and opposite portion of the ends 41a of the pins 41.

Thus, the force of the springs 48 against the pins 41 will cause said pins and the synchronizer braking ring 33 affixed thereto to be urged in one direction while the reaction of said spring 48 against the synchronizer braking ring 31 will tend to cause said latter ring and the pins 44 carried thereby to be urged in the opposite direction. The distance through which said oppositely urged parts may move circumferentially with respect to each other will be limited by difference in radius of the portions 41a and 41b, 44a and 44b respectively of the said pins 41 and 44.

*Operation*

In considering the operation of the apparatus above described it should be borne in mind that this synchronizing unit is intended for use under circumstances where one side of the system in this case the side represented by the input shaft 1 is always rotating at a speed faster than the other side of the system in this case the side represented by the shaft 8. An example of such a situation is where the input gear 1 is the output gear of a main transmission and the input gear of an auxiliary transmission, said two transmissions being connected in series with respect to each other, such as shown in United States Patent No. 2,637,221 and the shaft 8 is the output shaft of the transmission system, said shaft 8 being, for example, connected to the driving wheels of a vehicle. Thus, during use, the magnitude of the relative rotational speed of the shaft 1 with respect to the shaft 8 and of the shaft 8 with respect to the gear 9 will be as indicated by the lengths of the arrows $x$, $y$ and $z$, respectively, of FIGURE 4. Thus, when a shift to the left is initiated, the shaft 1 will be revolving faster than is the slider 19 and hence the shaft 8. When a shift to the right is initiated, the slider 19 will be revolving faster than the gear 9.

The springs 48 hold the pins 41 and 44 against the respectively opposite sides of the openings 26 and 27 as above mentioned and hence the ramps 42 and 46 are respectively opposed to the ramps 28 and 29.

Assuming now that a shift is being made involving a rightward movement of the slider 19, the slider 19 will move rightwardly whereby its ramp 28 will bear against the ramp 42 (FIGURES 1 and 4b) thereby causing the friction surface 34 to bear against the braking surface 16 of the gear 9 thus arresting the motion of the slider until substantial synchronism between the gear 9 and the slider 19 is reached, whereupon the pressure holding the ramps 28 and 42 together will diminish due to the rotational speed of slider 19 and gear 9 becoming equal and the shift will be completed in the usual manner (FIGURE 4c).

Where a shift in the opposite direction is desired, the ramp 29 will bear against the ramp 46 and will be released in the usual manner as the speeds approach synchronism, whereupon the slider 19 (FIGURE 4a) will continue leftwardly and its teeth 21 will engage the teeth 6.

It should be noted that this device has the advantage that the springs 48 may be relatively light inasmuch as they discharge only a pre-energizing function, namely, to insure that the ramps 42 and 46 will be aligned respectively with the ramps 28 and 29 at the beginning of a synchronized shifting operation. Thus, the springs 48 always hold the synchronizer in a pre-energized position but they will not interfere with the normal functioning of the apparatus.

It should also be noted that this particular embodiment of synchronizer illustrated in the drawings is intended for use wherein the shaft 1 revolves in a counter-clockwise direction when viewed from the right in FIGURE 1 (as indicated by the directions of the arrows *x, y* and *z* of FIGURE 4). Should rotation in the opposite direction be desired, the circumferential component of the force exerted by the springs 48 is reversed in direction so that said pre-energizing function is retained. The operational intrarelationships of the synchronizer so modified may be observed in FIGURES 4a, 4b and 4c by producing a mirror image reflection thereof about the central axis of one of the pins 41.

Although a particular preferred embodiment of the invention has been disclosed above for illustrative purposes, it will be understood that variations or modifications thereof which lie within the scope of the appended claims are fully contemplated.

What is claimed is:

1. In a synchronizer for axially spaced first and second jaw clutches, each thereof being respectively rotatable with one friction surface of first and second friction clutches, the combination comprising:
    a first synchronizer braking ring frictionally engageable with one of said friction surfaces and a second axially spaced synchronizer braking ring frictionally engageable with the other of said friction surfaces;
    a shaft;
    slider means on said shaft including jaw clutch teeth for occupying a first position to engage said first jaw clutch and occupying a second position for engaging said second raw clutch whereby to connect a selected one of said friction surfaces to said shaft;
    a flange extending radially from said slider means and occupying a position substantially between said synchronizer braking rings;
    at least two limit openings in said flange;
    a first pin fixed in said second synchronizer braking ring extending through one of said limit openings in said flange;
    blocker means being formed on adjacent portions of said flange and said pin, a second pin fixed into said first synchronizer braking ring and extending through said second limit opening in said flange and bearing against said second synchronizer braking ring and blocker means formed on adjacent portions of said second pin and said flange;
    biasing means constantly and resiliently urging opposite circumferential movement of said respective synchronizer braking rings, said movement being limited by said openings in said flange;
    whereby the blocker means existing between said pins and the respectively adjacent portions of said flange will always at the beginning of a synchronizing operation be in axailly aligned relationship to each other.

2. The device defined in claim 1 wherein said biasing means constitutes a resilient device anchored on said first synchronizer ring and bearing against said one pin.

3. The device defined in claim 1 including a plurality of pins corresponding to said one pin and similarly arranged with respect to said first and second synchronizer braking rings and said flange and resilient means arranged on said first synchronizer braking ring urging circumferential motion with respect to said first synchronizer braking ring of each of said first pins.

4. The device of claim 1 wherein a pin opening is provided in said first synchronizer braking ring and said first pin extends thereinto.

5. The device defined in claim 4 wherein said biasing means includes a spring opening in said first braking ring communicating with said pin opening therein and a resilient device in said spring opening bearing against said first pin, the alignment of said spring opening being such with respect to the pin opening that said resilient device imposes a force onto said pin having an appreciable circumferential component.

6. The device of claim 5 wherein said resilient device is a coil spring positioned chordally within said first braking ring.

7. In a synchronizer for axially spaced first and second jaw clutches, each thereof being respectively rotatable with one friction surface of first and second friction clutches, the combination comprising:
    a first synchronizer braking ring frictionally engageable with one of said friction surfaces and a second synchronizer braking ring, axially spaced from said first synchronizer braking ring, frictionally engageable with the other of said friction surfaces;
    a shaft;
    slider means on said shaft including jaw clutch teeth for occupying a first position to engage said first jaw clutch and occupying a second position for engaging said second jaw clutch whereby to connect a selected one of said friction surfaces to said shaft;
    a restricting ring connected for axial movement with said slider means, positioned substantially coaxial with said synchronizer braking rings and located therebetween;
    a plurality of limit openings in said restricting ring;
    pins extending between said synchronizer braking rings and through said limit openings, a first group of said pins connected for driving by the said first synchronizer braking ring and a second group of said pins connected for driving by said second synchronizer braking ring, and blocker means being formed on adjacent portions of said restricting ring and said pins;
    biasing means constantly and resiliently urging one group of said pins in opposite circumferential direction with respect to the other group of said pins;
    whereby said movement of said pins with respect to each other will be limited by said openings in said restricting ring and the blocking means respectively on said restrictor ring, and said pins will always be in blocking alignment with respect to each other.

References Cited by the Examiner
UNITED STATES PATENTS 2,483,841  10/1949  Peterson et al. _____ 192—53.6
2,573,613  10/1951  Schultze _____ 192—53.6

DON A. WAITE, *Primary Examiner.*

BENJAMIN W. WYCHE, *Examiner.*